United States Patent Office 3,391,145
Patented July 2, 1968

3,391,145
PHOSPHONIUM SALTS
Harry Tacon Openshaw and Norman Whittaker, London, England, assignors to Burroughs Wellcome & Co. (U.S.A.) Inc., Tuckahoe, N.Y., a corporation of New York
No Drawing. Filed Dec. 8, 1964, Ser. No. 416,883
Claims priority, application Great Britain, Dec. 9, 1963, 48,596/63
14 Claims. (Cl. 260—286)

ABSTRACT OF THE DISCLOSURE

A compound containing the cation of the Formula I

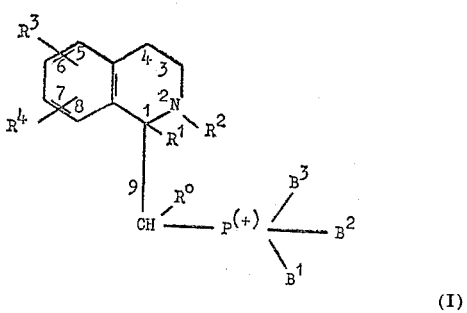

(I)

wherein $R^0$, $R^1$ and $R^2$ represent hydrogen atoms, or an additional double bond is formed in the absence of either $R^0$ and $R^1$, or $R^1$ and $R^2$ between C(9) and C(1), or C(1) and N(2) respectively, $R^3$ and $R^4$ are each a lower alkoxy group, having from 1 to 4 carbon atoms, or together form a methylenedioxy group, and each of $B^1$, $B^2$ and $B^3$ is an alkyl, phenyl or substituted phenyl group.

The present invention relates to novel phosphonium salts and corresponding phosphoranes, and the manufacture thereof.

The phosphonium salts provided by the invention contain cations of the following general Formula I

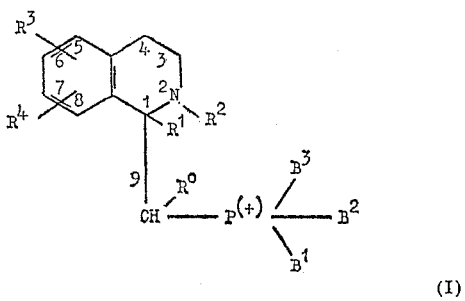

(I)

wherein $R^0$, $R^1$ and $R^2$ represent hydrogen atoms, or an additional double bond is formed in the absence of either $R^0$ and $R^1$, or $R^1$ and $R^2$ between C(9) and C(1), or C(1) and N(2) respectively, $R^3$ and $R^4$ are each a lower alkoxy group, having from 1 to 4 carbon atoms, or together from a methylenedioxy group, and each of $B^1$, $B^2$ and $B^3$ is an alkyl, phenyl or substituted phenyl group.

These compounds exist in the form of salts with a suitable anion, and by virtue of containing a basic nitrogen atom they may also form acid addition salts. On treatment with strong bases, such as sodamide or the sodium derivative of dimethyl sulphoxide, phosphonium salts containing the cation of Formula I are converted into the corresponding phosphoranes of the Formula II

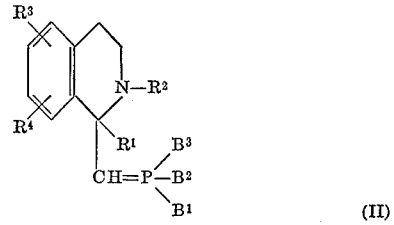

(II)

wherein $R^1$, $R^2$, $R^3$, $R^4$, $B^1$, $B^2$ and $B^3$ are as defined in Formula I. If there is a double bond between C(9) and C(1) in the phosphonium salt, this migrates to the 1,2-position when the phosphorane is formed.

The phosphonium salts are stable and may easily be prepared in a solid form. The phosphoranes, however, are unstable and decompose on exposure to moisture; thus they are preferably formed and used as a solution in an anhydrous solvent.

These phosphonium salts and phosphoranes are useful as intermediates, for instance in the synthesis of pharmacologically active compounds. For example if a phosphorane of Formula II, in which $R^3$ and $R^4$ are methoxy groups, is reacted with p-chlorobenzaldehyde and the product is reduced and N-methylated, 1,2,3,4-tetrahydro-2 - methyl-6,7-dimethoxy-1-(4-chlorophenethyl)isoquinoline, a known analgesic, is formed. Similarly, if a 3,4-dihydro-6,7-dimethoxy-1-isoquinolylmethylene phosphorane is reacted with 3-methyl-1,2,3,4,6,7-hexahydroxy-9,10-dimethoxy-2-oxo-11bH-benzo(a)quinolizine, 2-dehydro-O-methylpsychotrine is formed. Phosphoranes are particularly advantageous in this synthesis, as they give rise to products having the desired stereo chemical configuration. Reduction of 2-dehydro-O-methylpsychotrine by known methods leads to 2-dehydroemetine, which is a valuable amoebicide.

It has been found that the compounds formulated hereinbefore can be manufactured by reacting a compound of the general Formula III

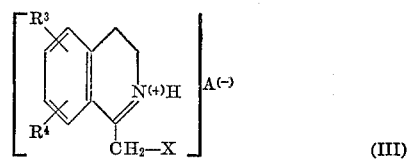

(III)

wherein $R^3$ and $R^4$ are as defined in Formula I, A is the anion of a strong acid, for instance hydrochloric or sulphuric acid, and X is a chlorine or bromine atom, with a substituted phosphine of Formula IV

(IV)

wherein $B^1$, $B^2$ and $B^3$ are as defined in Formula I, in a substantially anhydrous polar solvent in which both reactants are appreciably soluble. Nitromethane, acetonitrile and chloroform are examples of such a solvent. The product may be isolated as an acid addition salt of the Formula V

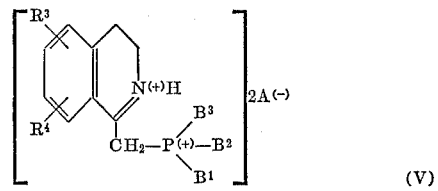

(V)

Phosphonium salts of Formula V can be converted into phosphonium salts of Formula VI

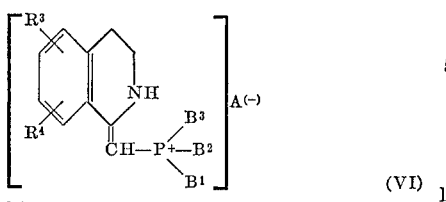

by treatment with a weak base, such as ammonia, and either of the phosphonium salts of Formula V and VI may be reduced catalytically with hydrogen or with a suitable reducing agent such as a metal borohydride to the corresponding saturated phosphonium salts of the Formula VII

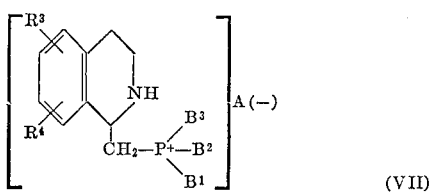

or an acid addition salt thereof.

In Formulae V, VI and VII the substituents have the same meaning as defined in Formulae I and III.

As these compounds are used as intermediates in other syntheses, the precise nature of $B^1$, $B^2$ or $B^3$ is relatively unimportant, because those substituents are eliminated at the later stages of those syntheses and do not appear in the final products obtained from the phosphoranes. Though various phosphines, in which $B^1$, $B^2$ or $B^3$ are for example alkyl or substituted phenyl groups, may also be used to form the corresponding phosphonium salts or phosphoranes according to the present invention, it is convenient and thus preferred to use triphenylphosphine for the purpose.

Accordingly the invention in one aspect therefore provides phosphonium salts containing the cation of the Formula I and phosphoranes of Formula II.

In another aspect, there is provided a method for producing phosphonium compounds containing the cation of the Formula I, which process comprises reacting a compound of the Formula III with a subsituted phosphine of the Formula IV, isolating the product as an acid addition salt and, if desired, treating the phosphonium salt so obtained with a weak base, or reducing the same catalytically with hydrogen or with a reducing agent to the corresponding saturated phosphonium salt in which all of $R°$, $R^1$ and $R^2$ are hydrogen atoms.

In a further aspect there is provided a method for producing phosphoranes of Formula II which comprises treating a phosphonium salt containing the corresponding cation of the Formula I with a strong base under substantially anhydrous conditions.

The following examples illustrate the invention:

Example 1

A mixture of 1 - chloromethyl - 3,4 - dihydro - 6,7 - dimethoxyisoquinoline hydrochloride (0.5 g.), triphenylphosphine (0.95 g.), and dry chloroform (1 ml.) was heated in a sealed tube at 100° C. for 5 minutes, then kept at room temperature for 2 days. When the resulting suspension of crystals was treated with acetone (10 ml.), most of the crystals dissolved. Addition of the further quantity (40 ml.) of acetone caused the crystallisation of pale yellow crystals of (3,4-dihydro-6,7-dimethoxy-1-isoquinolylmethyl)triphenylphosphonium chloride hydrochloride dihydrate (0.32 g.), M.P. 197° C. (efferv.).

Example 2

A mixture of 1 - chloromethyl - 3,4 - dihydro - 6,7 - dimethoxyisoquinoline hydrochloride (30 g.) and triphenylphosphine (57 g.) was treated with nitromethane (90 ml.) and set aside at room temperature, with occasional shaking, for 8 days. The reaction mixture was taken up in acetone (1800 ml.), treated with 50% w./v. hydrogen bromide in acetic acid (75 ml.), seeded, and set aside to give yellow crystals of hydrated (3,4-dihydro-6,7-dimethoxy-1-isoquinolylmethyl)triphenylphosphonium bromide dihydrobromide (61.3 g.), M.P. 218–220° C. (efferv.). (The additional molecule of hydrobromic acid is assumed to be loosely attached to one of the oxygens, which are slightly basic. On drying at 100° C. in vacuo, the water of crystallisation and one molecule of hydrogen bromide are removed, giving the anhydrous phosphonium bromide monohydrobromide.)

Addition of aqueous ammonia to an aqueous solution of this compound gave colourless crystals, M.P. 218–220° C., of the (1,2,3,4-tetrahydro-6,7-dimethoxy-1-isoquinolylidenemethyl)triphenylphosphonium bromide monohydrate. Drying at 90° C. gave the anhydrous salt.

Example 3

The above anhydrous phosphonium bromide (3.0 g.) was added to a stirred suspension of sodamide [prepared from sodium (0.51 g.) and liquid ammonia (50 ml.)]. After 5 minutes, dry anisol (20 ml.) was added, and after a further 20 minutes the ammonia was allowed to evaporate and the residual suspension was brought to 80° C. in a current of dry nitrogen. The suspension was then cooled to 40° C. and filtered with exclusion of moisture, and the filtrate was added to racemic 3-ethyl-1,2,3,4,6,7-hexahydro-9,10-dimethoxy-2-oxo-11bH - benzo[a]quinolizine (0.79 g.). The resulting solution was evaporated in vacuo, and the residue was heated in a bath at 145° C., under dry nitrogen, for 3 hours. The cooled gum was shaken with benzene (45 ml.) and water (40 ml.) until dissolved (about 2 hours), and the benzene solution of the product was washed with water and extracted with water (30 ml.) containing a slight excess of N-HCl (about 12 ml.). The aqueous extract was washed (benzene) and evaporated in vacuo, and a solution of the residue in a mixture of methanol (30 ml.) and 50% w./v. hydrogen bromide in acetic acid (1 ml.) was evaporated. The residue was taken up in methanol (15 ml.), treated with 50% w./v. hydrogen bromide in acetic acid, seeded, and diluted with ether (about 10 ml.), to give 1.04 g., M.P. 192–194° C (efferv.), of racemic 2-dehydro-O- methylpsychotrine dihydrobromide. This was identical (I.R. spectrum) with an authentic sample.

Example 4

Sodium hydride (0.54 g. of a 50% w./w. oil dispersion) was washed several times with petroleum (B.P. 40–60° C.), heated in a bath at 70° C. in a current of dry nitrogen to remove traces of petroleum, and then heated with dimethyl sulphoxide (6.5 ml.) at 70 to 75° C. for 45 minutes. The solution thus obtained was treated with a solution in dimethyl sulphoxide (22 ml.) of the anhydrous phosphonium bromide (5.8 g.) of Example 2, with ice cooling, and the resulting phosphorane solution was set aside for 10 minutes at room temperature. Following the addition of p-chlorobenzaldehyde (3.0 g.), with shaking and cooling, the reaction mixture was left at room temperature overnight, treated with water (100 ml.), and extracted with chloroform (2×100 ml.). The chloroform solution was washed several times with water, dried over anhydrous sodium sulphate, and evaporated, and a solution of the residue in acetone (65 ml.) was treated with an excess of ethanolic hydrogen chloride. The resulting suspension of orange-yellow crystals was treated with ether (20 ml.), set aside for 1 hour, and filtered, giving 2.38 g., M.P. 196° C. (efferv.), of 1-p-chlorostyryl-3,4-dihydro-6,7-dimethoxyisoquinoline hydrochloride.

Example 5

A suspension of the phosphonium bromide monohydrate (20 g.) of Example 2 in methanol (250 ml.) was treated with a 45% w./v. solution of hydrogen bromide in acetic acid (6.6 ml.) and the resulting solution was shaken with platinum oxide (0.8 g.) under hydrogen, absorbing 1095 ml. [22° C., 764 mm. Hg] during 40 minutes. The filtered solution was evaporated, the residual syrup was warmed with acetone (150 ml.), and the resulting suspension of colourless crystals was diluted with acetone to 750 ml. and set aside, giving 19.9 g., M.P. 190–191° C. (efferv.), of [1,2,3,4-tetrahydro-6.7-dimethoxy - 1 - isoquinolylmethyl]triphenylphosphonium bromide hydrobromide sesquihydrate. The anhydrous product was obtained by azeotropic distillation with toluene.

Example 6

A solution of the anhydrous phosphonium bromide hydrobromide (5.75 g.) of Example 5 in dimethyl sulphoxide (22 ml.) was added, with ice cooling, to a solution prepared from sodium hydride (0.88 g. of a 50% w./w. oil-dispersion) and dimethyl sulphoxide (10.5 ml.) in the manner of Example 4. The resulting phosphorane solution was set aside for 10 minutes at room temperature and treated with p-chlorobenzaldehyde (2.57 g.), with shaking and cooling. The reaction mixture was set aside at room temperature overnight and treated with water (100 ml.), and the product was isolated by the procedure of Example 4, yielding colourless crystals of 1-p-chlorostyryl-1,2,3,4-tetrahydro - 6,7 - dimethoxyisoquinoline hydrochloride (1.55 g.), M.P. 257° C. (efferv.). Recrystallisation from ethanol raised the M.P. to 263° C. (efferv.). An identical compound resulted when the product of Example 4 was reduced with sodium borohydride in 90% v./v. methanol.

What we claim is:

1. A compound containing the cation of the Formula I

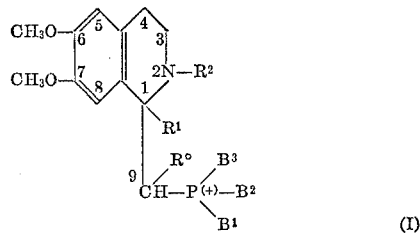

wherein R°, R¹, and R² represent hydrogen atoms, or an additional double bond is formed in the absence of either R° and R¹, or R¹ and R² between C(9) and C(1), or C(1) and N(2) respectively, and each of $B^1$, $B^2$ and $B^3$ are selected from the class consisting of alkyl, phenyl and substituted phenyl.

2. (3.4-dihydro-6,7-dimethoxy - 1 - isoquinolylmethyl) triphenylphosphonium chloride and its salts.

3. (3,4-dihydro-6,7-dimethoxy - 1 - isoquinolylmethyl) triphenylphosphonium bromide and its salts.

4. (1,2,3,4-tetrahydro-6,7-dimethoxy - 1 - isoquinolylindenemethyl) triphenylphosphonium bromide.

5. (1,2,3,4-tetrahydro-6,7-dimethoxy - 1 - isoquinolylmethyl) triphenylphosphonium bromide and its salts.

6. A compound of the Formula II

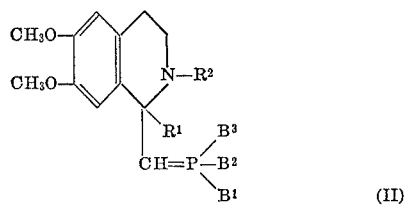

wherein R¹ and R² represent hydrogen atoms or an additional double bond is formed in their absence, and each of $B^1$, $B^2$ and $B^3$ are selected from the class consisting of alkyl, phenyl and substituted phenyl.

7. A method for producing compounds of the Formula V

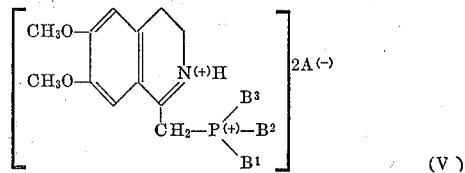

wherein $B^1$, $B^2$ and $B^3$ are as defined in claim 1, and A is the anion of a strong acid, by reacting a compound of the Formula III

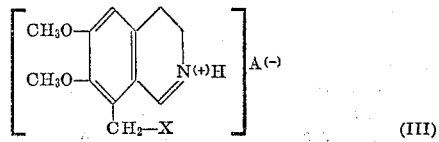

wherein A is as defined above and X is a chlorine or bromine atom, with a substituted phosphine of Formula IV

wherein $B^1$, $B^2$ and $B^3$ are as defined above, in an anhydrous polar solvent in which both reactants are appreciably soluble.

8. A method according to claim 7, in which (3,4-dihydro-6,7-dimethoxy - 1 - isoquinolylmethyl) triphenylphosphonium chloride hydrochloride is produced by reacting 1-chloromethyl-3,4-dihydro - 6,7 - dimethoxyisoquinoline hydrochloride with triphenylphosphine in chloroform and isolating the product by the addition of acetone.

9. A method according to claim 7, in which (3,4-dihydro-6,7-dimethoxy - 1 - isoquinolylmethyl) triphenylphosphonium bromide dihydrobromide is produced by reacting 1-chloromethyl-3,4-dihydro - 6,7 - dimethoxyisoquinoline hydrochloride with triphenylphosphine in nitromethane, and isolating the product by addition of acetone in the presence of hydrogen bromide.

10. A method for producing compounds of the Formula VI

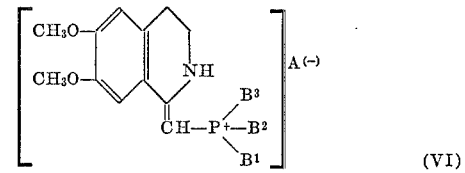

wherein $B^1$, $B^2$ and $B^3$ are as defined in claim 1, and A is the anion of a strong acid, by treating a compound of Formula V

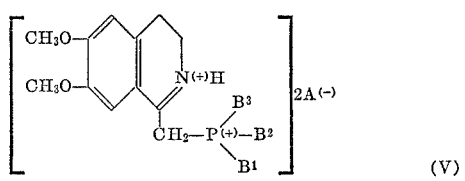

wherein $B^1$, $B^2$, $B^3$ and A are as defined above, with a weak base such as ammonia.

11. A method according to claim 10, in which (1,2,3,4-tetrahydro-6,7-dimethoxy - 1 - isoquinolylidenemethyl) triphenylphosphonium bromide is produced by treating (3,4-dihydro-6,7-dimethoxy - 1 - isoquinolylmethyl)triphenylphosphonium bromide hydrobromide with ammonia.

12. A method for producing compounds of the Formula VII or acid addition salts thereof.

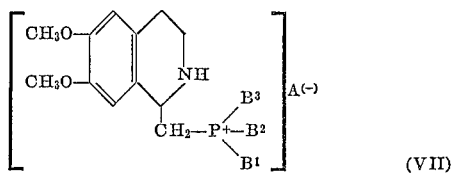

(VII)

wherein $B^1$, $B^2$, and $B^3$ are as defined in claim 1 and A is the anion of a strong acid by reducing a compound of Formula V or VI, defined in claim 7, catalytically with hydrogen or with a suitable reducing agent such as a metal borohydride.

13. A method according to claim 12, in which [1,2,3,4,-tetrahydro-6,7-dimethoxy - 1 - isoquinolylmethyl]triphenylphosphonium bromide hydrobromide is produced by reducing (1,2,3,4-tetrahydro-6,7-dimethoxy - 1 - isoquinolylidenemethyl)triphenylphosphonium bromide with hydrogen in the presence of platinum oxide as a catalyst.

14. A method for producing a compound of Formula II

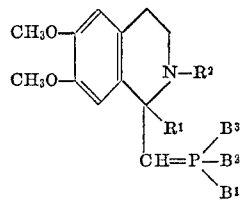

(II)

wherein $R^1$, $R^2$, $B^1$, $B^2$ and $B^3$ are as defined in claim 6, by treating a compound containing the cation of Formula I

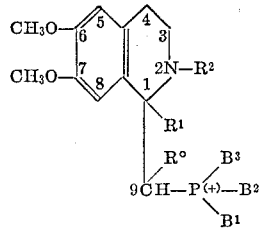

(I)

wherein $R^1$, $R^2$, $B^1$, $B^2$ and $B^3$ are as defined above, and $R°$ is a hydrogen atom or an additional double bond is formed in the absence of either $R°$ and $R^1$, or $R^1$ and $R^2$ between C(9) and C(1), or C(1) and N(2) respectively, with a strong base under anhydrous conditions.

References Cited

UNITED STATES PATENTS 3,143,544   8/1964   Van Dormael _____ 260—240

FOREIGN PATENTS 6,414,305   6/1965   Netherlands.

NICHOLAS S. RIZZO, *Primary Examiner.*

D. G. DAUS, *Assistant Examiner.*